Figure 1:
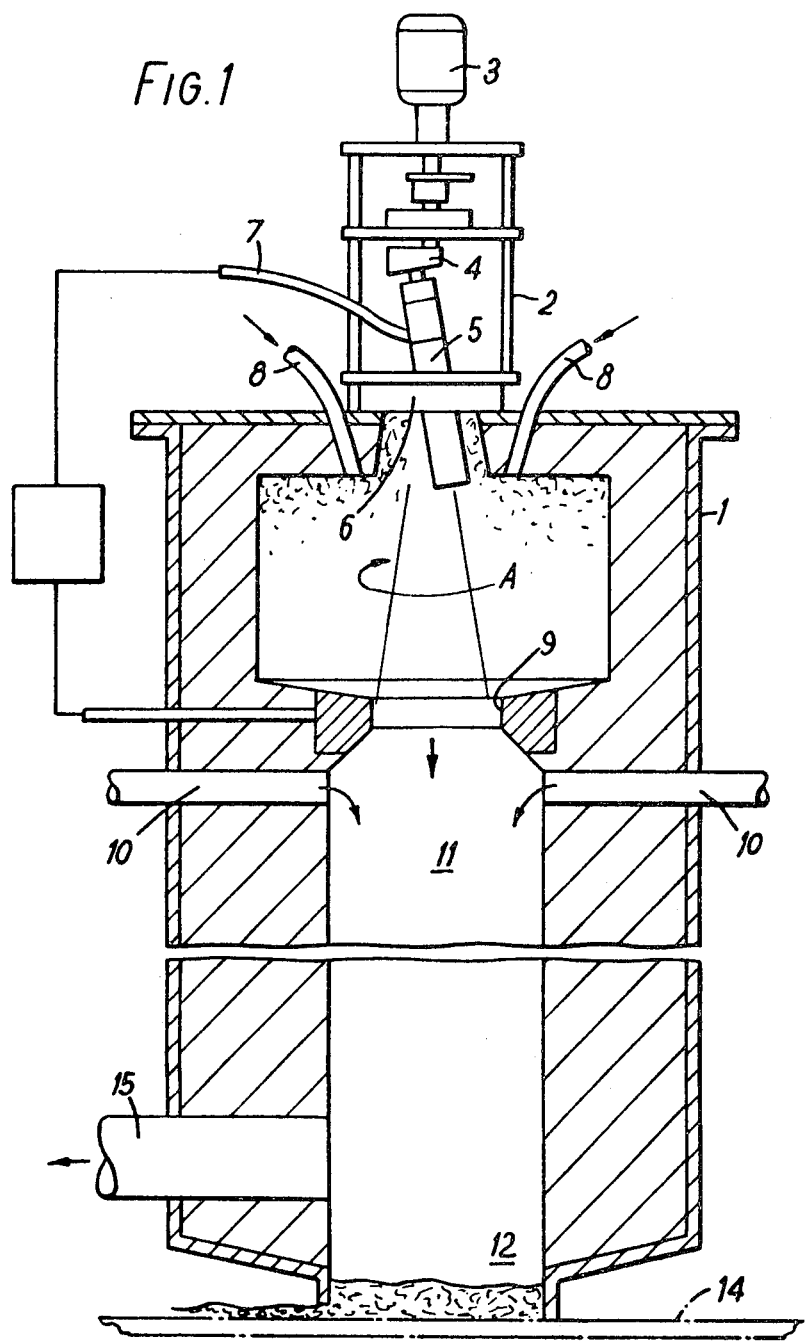

United States Patent [19]

Tylko

[11] 4,215,232

[45] Jul. 29, 1980

[54] PRODUCTION OF HYDRAULIC CEMENTS AND CEMENT-FORMING MATERIALS

[75] Inventor: Jozef K. Tylko, Faringdon, England

[73] Assignee: The Rugby Portland Cement Company Limited, Rugby, England

[21] Appl. No.: 10,427

[22] Filed: Feb. 8, 1979

Related U.S. Application Data

[62] Division of Ser. No. 848,031, Nov. 3, 1977, Pat. No. 4,152,169.

[30] Foreign Application Priority Data

Nov. 4, 1976 [GB] United Kingdom ............... 45839/76
Jul. 9, 1977 [GB] United Kingdom ............... 28881/77

[51] Int. Cl.² .................... H05H 1/00; H05H 1/24
[52] U.S. Cl. ..................................................... 13/2 P
[58] Field of Search ............. 13/2 P, 9 R; 219/121 P; 106/103

[56] References Cited

U.S. PATENT DOCUMENTS

Re. 28,570  10/1975  Tylko ............................. 13/9 R X
3,936,586   2/1976   Tylko ........................... 219/121 P X Primary Examiner—Roy N. Envall, Jr.
Attorney, Agent, or Firm—Dennison, Dennison, Meserole & Pollack

[57] ABSTRACT

Material for the production of hydraulic cements or for pozzolanic materials which develop cementatious characteristics after blending with an activator, is treated in an expanded precessive plasma in a plasma reactor of the type in which at least one plasma gun orbits about a vertical axis and is directed obliquely to said axis towards a counter electrode. The material preferably includes at least a proportion of a naturally occurring carbonaceous material of low calorific value, such as colliery spoil, oil shale or oil sand. In such case, as the material emerges from the plasma it is preferably contacted with air to effect combustion of the combustible material. The thermal energy thus released is recovered by suitable instrumentalities and is preferably converted to electrical energy to power the plasma reactor.

2 Claims, 9 Drawing Figures

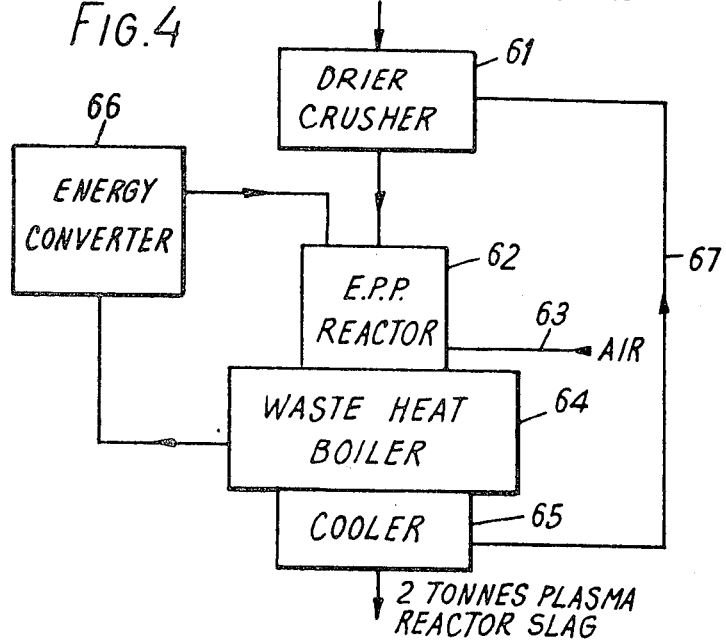
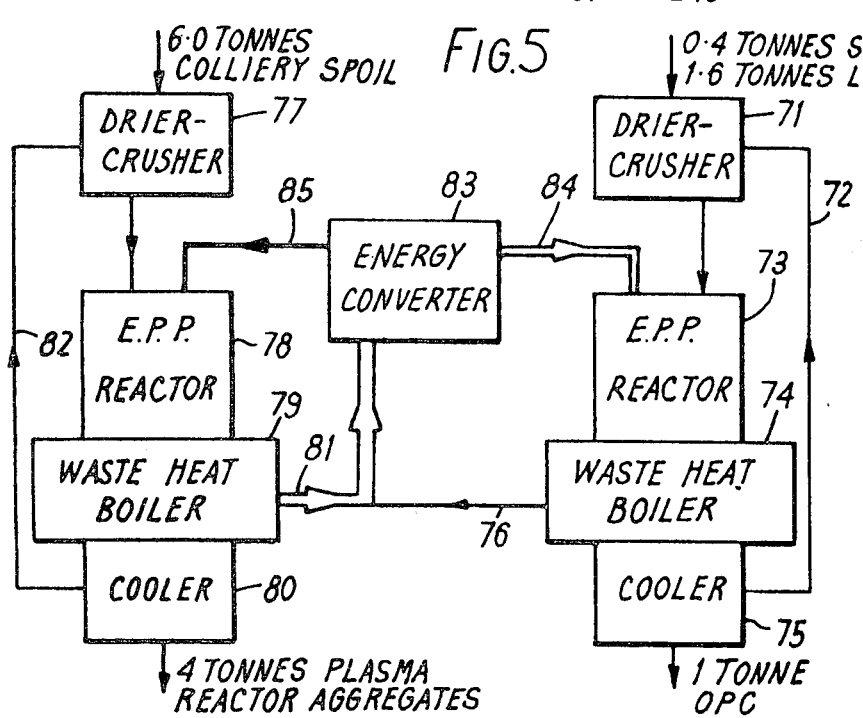

PRODUCTION OF HYDRAULIC CEMENTS AND CEMENT-FORMING MATERIALS

This is a division of application Ser. No. 848,031, filed Nov. 3, 1977 now U.S. Pat. No. 4,152,169.

The present invention relates to the production of hydraulic cements. The term hydraulic cement is used herein to denote compositions which set into a solid mass when mixed with an appropriate quantity of water. The term is however only used with relation to compositions comprised of complexes formed from at least two of CaO, $Al_2O_3$ and $SiO_2$. Such cement compositions may also include combined $Fe_2O_3$, FeO, MgO and other oxides.

The present invention also relates to the production of similar complexes, which may be converted into hydraulic cements by the addition of appropriate quantities of alkaline activators without further thermal treatment. In many instances the activation is achieved solely by mixing with ordinary portland cement.

Although portland cement is produced in enormous quantities by firing calcareous material (limestone, chalk etc.) with aluminosilicate clays, mixed in appropriate quantities, it is well known that the theoretical energy requirements of the process are quite high and the overall thermal efficiency of the process is of the order of 30–50%. Portland cement is far more widely used in practical applications than any other hydraulic cement composition, but it is well known that there are other possible compositions in the system $CaO$-$SiO_2$-$Al_2O_3(Fe_2O_3)$ which exhibit satisfactory cementing characteristics or which will do so after admixture with appropriate quantities of an alkaline activator such as CaO or portland cement.

A composition which exhibits cementing characteristics after addition of an activator may be considered as a hydraulic cement precursor. It is well known to use blast furnace slag in admixture with ordinary portland cement as a hydraulic cement.

In the commercial production of portland cement, as commonly performed, the cement-forming feedstocks are introduced into an inclined rotary kiln and are roasted by means of carbonaceous fuel (either coal admixed with the feed or oil or gas introduced via a burner at the lower end of the kiln). The capital cost involved in the construction of a rotary cement kiln is high and its efficiency of fuel utilisation is modest.

In the operation of a rotary cement kiln in the production of portland cement certain constraints are imposed by the formation of clinker rings on the kiln wall when the ratio of silica/alumina and iron oxide falls below about 2.2:1.

We have already described in British Pat. No. 1,390,351 a plasma reactor which includes a plasma gun which orbits about and is inclined in relation to a vertical axis and co-operates with a counter-electrode, usually a ring-shaped counter-electrode in a middle region of the reactor, but which may be a conductive bottom of the reactor.

Another form of plasma reactor incorporating one or more plasma guns which orbit about a vertical axis and are inclined towards the axis of rotation has been described in our U.S. Pat. No. 3,936,586. In this plasma reactor the plasma gun or guns is directed inwardly towards the axis and towards an opposed portion of a ring-shaped counter-electrode.

In a plasma reactor operating on these principles the orbiting motion of the plasma gun and its inclination to the orbit axis results in the establishment of a plasma jet which traces the latus rectum of a cone. When the orbital velocity of the gun is of the order of 1000 revolutions/min. it is statistically impossible for more than a very minor fraction of small solid particles falling under gravity to pass through the path of the plasma jet without becoming highly energised either by the ions, electrons or other highly charged particles of the plasma or by collision with such energised particles. In consequence the orbiting plasma jet imparts energy to matter lying in an extended region in relation to the path of the primary plasma jet and the region of influence of the plasma has been expanded. The term "expanded precessive plasma" has been coined to describe this effect.

In the broadest aspect of the invention a hydraulic cement or hydraulic cement precursor may be produced by passing a material of appropriate chemical composition and in suitable comminuted form through a plasma zone in a plasma reactor of the type above described or generally constructed so as to maintain plasma within an extended space within a plasma reactor. The exposure of a mineral mixture of appropriate composition to the very high energy conditions of the plasma results in at least a surface transformation of the material into an active glassy or crystalline condition or complete conversion of the particles into a hydraulic cement or hydraulic cement precursor where they are sufficiently finely comminuted.

Since in the procedure of the present invention the thermal treatment of the feed material may take place while the particles are in flight the formation of hard deposits, such as the clinker incrustations in a rotary kiln, seems unlikely to result in operating difficulties and therefore the production of cement by the method of the invention is not subjected to a constraint arising from the silica/alumina + iron oxide (S/R ratio) of the feed material but only by the constraint that the fired material shall have cementitious characteristics, either alone or after blending with an activator.

It has already been proposed by F. P. Glasser in Cement and Concrete Research (1975), Vol. 5, pp 55–61, to produce portland cement in a plasma furnace employing stationary plasma torches located in the cover of a rotating furnace body of generally inverted conical shape. Feed material was fed through an axial probe in the cover. From the description it appears that the feed material was thrown onto the walls of the rotating body without effective contact with plasma during flight. The plasma acted on a thin film of molten material on the walls of the rotating furnace body with the result that the energy losses through the reactor wall were very high and the energy requirements for the production of cement were reported as being approximately ten times the requirements of a conventional cement kiln. Furthermore the clinker product emerging from the plasma was either coarse, requiring excessive energy for grinding, or contained excessive quantities of glass phases. The reported results were so unfavorable to the use of plasma as to suggest the total impossibility of ever employing a plasma furnace in cement production.

We have however found that when comminuted cement feed material passes through a zone in which the plasma present is derived from a plasma torch which moves about and is inclined to the axis of the zone the particles of feed material may be wholly converted to cement or a cement precursor in flight, without becoming fused into coarser particles and without formation of excessive glass phase. We have been able to achieve production of ordinary portland cement in a small scale plasma reactor of this type at energy consumption levels only marginally greater than in a fully developed large scale rotary kiln, so that the method of the invention is indicated as being capable of producing portland cement at an energy consumption equal to or lower than a conventional rotary cement kiln when the plasma reactor is scaled up to full commercial size.

The production of cement by firing normal portland cement feeds constitutes one aspect of the invention. The removal of the constraint, imposed by the S/R ratio in the operation of a rotary cement kiln, allows non-traditional materials to be employed in the production of cements and cement precursors when employing the procedures of the present invention.

There are, both in the United Kingdom and in many other parts of the world, already accumulated enormous quantities of carbonaceous materials which have a low calorific value and which have been regarded either as waste materials (colliery spoil) or as uneconomic to work to recover carbon or hydrocarbons (oil shales and oil sands).

It is an object of this invention to convert carbonaceous materials of this class to hydraulic cements, either directly or by production of cement precursors, which can be converted to hydraulic cements by appropriate additions of activators. In both types of treatment it is foreseen that additional mineral substances may be required to be blended with the carbonaceous material before treatment in a plasma zone in order to obtain an appropriate final chemical composition of the product.

The spoil heaps of collieries represent enormous stockpiles of material having a definite calorific value which preexisting technology has rarely been able to put to use. Colliery spoil heaps are objectionable from an environmental standpoint and their conversion to useful products (accompanied by their removal) must be welcomed.

The calorific value of the carbon content of colliery spoil is rarely less than 800 KJ/kg and in many instances may be as high as 10,000 KJ/kg. Even at the latter level it has not always been found economically practicable to put the available heat content to use. Since the theoretic heat requirement for the production of portland cement from conventional materials is of the order of 1700 KJ/kg, it will be seen that the heat requirements for the production of a hydraulic cement may be wholly or in large part satisfied by the calorific value of colliery spoil and indeed the calorific value of colliery spoil may provide additional usable heat energy where suitable processes are developed for the combustion of the carbon (including the hydrocarbon) content of the colliery spoil.

In one of its aspects the present invention comprises passing colliery spoil or other material having a carbonaceous content of calorific value of at least 800 KJ/kg through the plasma zone of a reactor of the type already discussed.

When the colliery spoil or other carbonaceous material (either alone or in admixture with other substances) is exposed to the energy transfer conditions of the plasma zone, there is apparently a tendency for the hydrocarbon content to respond with almost explosive force so that the carbonaceous material undergoes some disintegration and the carbon content (including the hydrocarbon content) is separated from the inorganic content instantaneously. This enables the carbon content of the material to be burnt off, thus converting the waste material to a hydraulic cement or cement precursor, providing that the chemical composition of the feed material is correct for the purpose. Examination of the product shows it to be essentially without free carbon.

In one form of the invention the cement-forming feed materials are supplied in a steady stream at a location in the region of the plasma gun at the top end of the reactor and fall through the plasma zone existing between the plasma gun and a ring shaped counter-electrode and through the tail flame region existing below the counter-electrode. This brings the carbon content of the feed particles into a highly active condition, so that at least a part of the carbon content is very rapidly converted to CO when the particles are brought into contact with a stream of air (or oxygen) after emergence from the plasma zone. The stream of air, partially enriched with CO and hydrogen and carrying the solid particles, may then be injected into a combustion zone where the remainder of the carbon content and the already evolved CO and hydrogen are at least partially oxidised to $CO_2$. The combustion zone preferably forms part of a waste-heat boiler system, so that the heat energy thus liberated is recovered and employed in any suitable manner. Very conveniently it is employed for generation of electrical energy for the plasma reactor. The reacted solid material is recovered from the gas stream as an ash in the waste-heat boiler. Known apparatus, such as a cyclone separator, is employed for collection of fine solids from the waste gases.

In another form of the invention where the counter-electrode is constituted by the reactor bottom, the feed material falling through the plasma zone is allowed to collect as a pool of at least partially molten slag in the reactor bottom. At the operating temperatures involved the molten slag is sufficiently conductive. Where the initial material has a high iron (iron oxide) content (as is frequently the case with colliery spoil) the carbon content of the spoil may be employed to effect reduction of at least part of the iron oxide and consequently metallic iron collects in the bottom of the reactor and is periodically tapped off. In this system also the evolved CO may be burnt in a waste-heat boiler or other form of heat recuperator.

The molten slag is periodically tapped off from the reactor bottom and, according to its remaining carbon content, may be subjected to an air blast in a separate chamber in order to burn out any remaining carbon. The molten slag is then cooled and ground.

In both of the above described forms of the invention the carbonaceous material fed to the plasma zone is ground (as indeed are the materials supplied to a conventional cement kiln). It is apparently unnecessary to employ exceptionally fine grinding and it has been found quite satisfactory to grind the material to pass through a 300 micron aperture mesh. Indeed a somewhat coarser particle size may be satisfactorily employed in many instances.

Where the colliery spoil or other carbonaceous material requires to be blended with other materials, such as limestone or silica- and/or alumina-bearing materials, before introduction into the plasma reactor, it is satisfactory to employ the known wet or dry methods commonly employed in the cement industry.

It is however found that in many instances the chemical composition of the non-carbonaceous contents of colliery spoil are such that after burning out the carbonaceous matter, the resulting material is suitable for blending in large proportion with ordinary portland cement (either made by the use of the present invention or in a conventional rotary kiln). Thus from published literature relating to colliery waste in the United Kingdom (which is believed to be typical of colliery waste at least in the Northern Hemisphere) the $SiO_2/Al_2O_3$ and $Fe_2O_3$ and FeO ratio is in the range of approximately 1.8–2.0/1, with accompanying calorific values in the range of 1500–10,000 KJ/kg. In all cases the content of CaO and MgO appears to be in the range of 2.5–4.0% of the ash produced by complete firing of the colliery waste. In many cases it is preferred to blend in above 10% CaO (as powdered chalk) before firing the comminuted colliery spoil in a plasma reactor.

While the invention primarily contemplates the use of materials of relatively low calorific value of up to 10,000 KJ/kg, in some cases materials of high calorific value, such as coal and waste hydrocarbon oils or other organic wastes, may be incorporated in material fed into the plasma.

Figure 2:
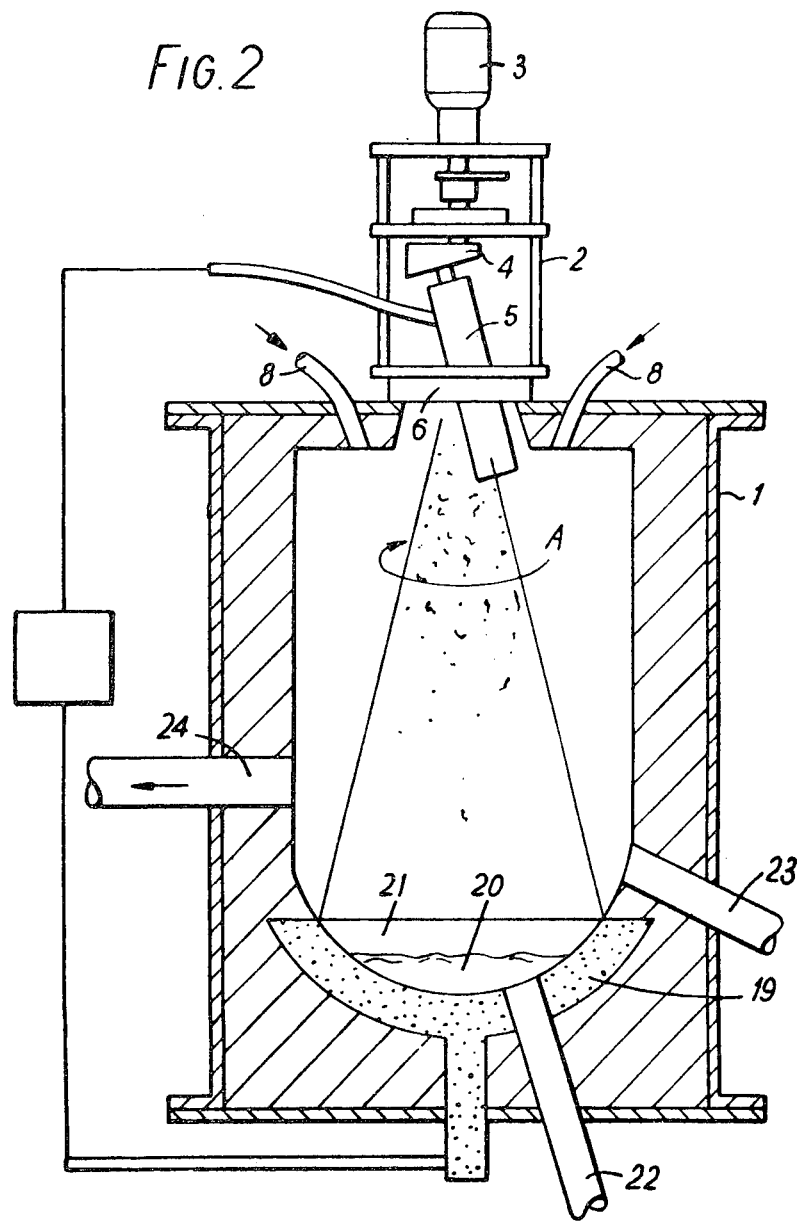
Figure 3:
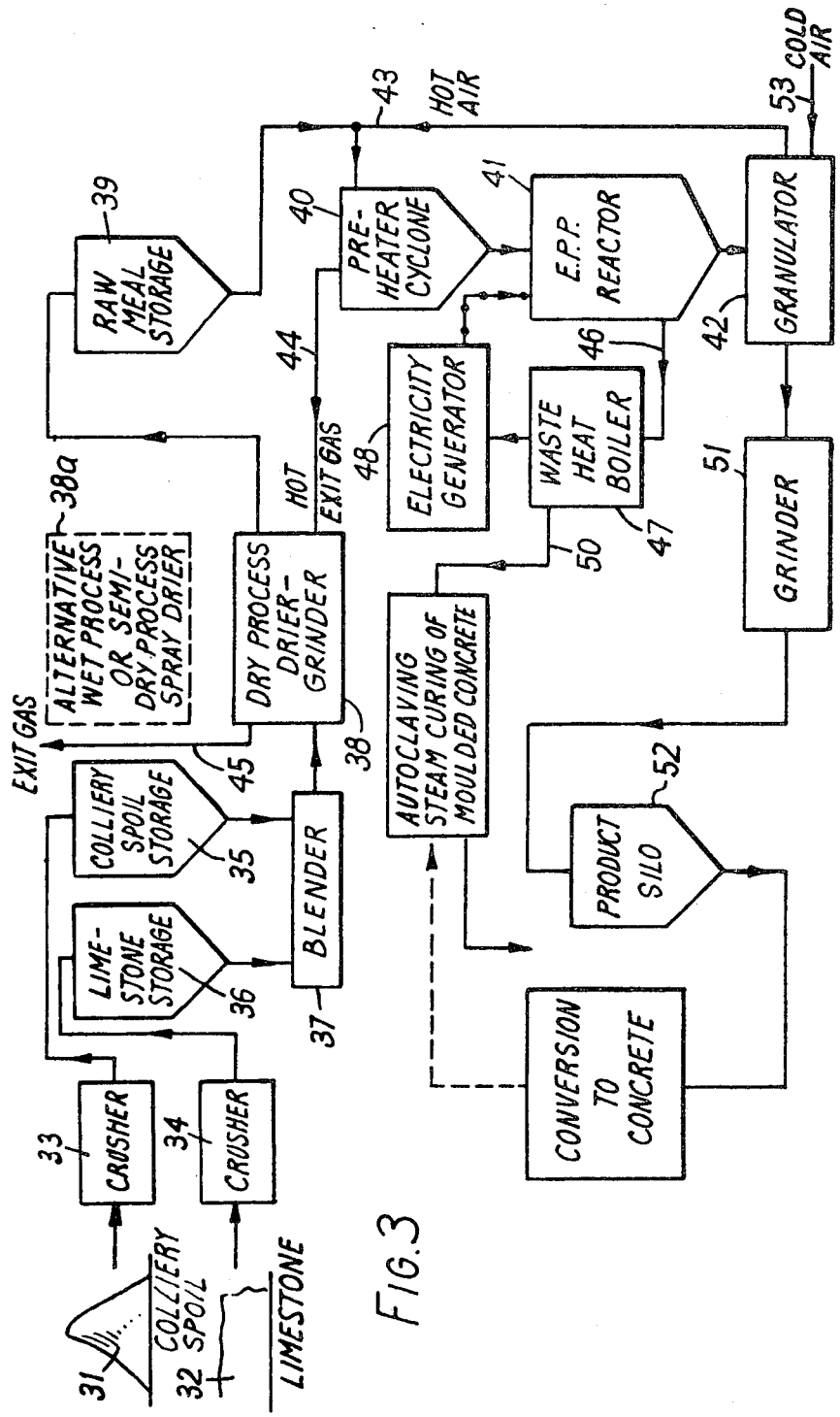
Figure 6:
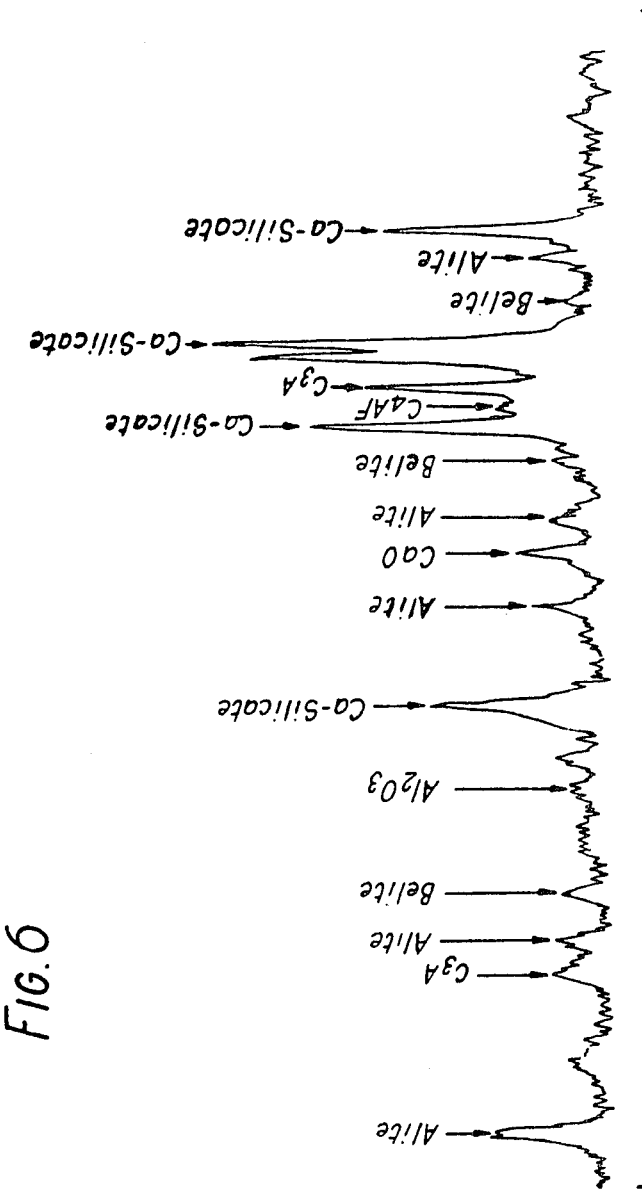
Figure 7:
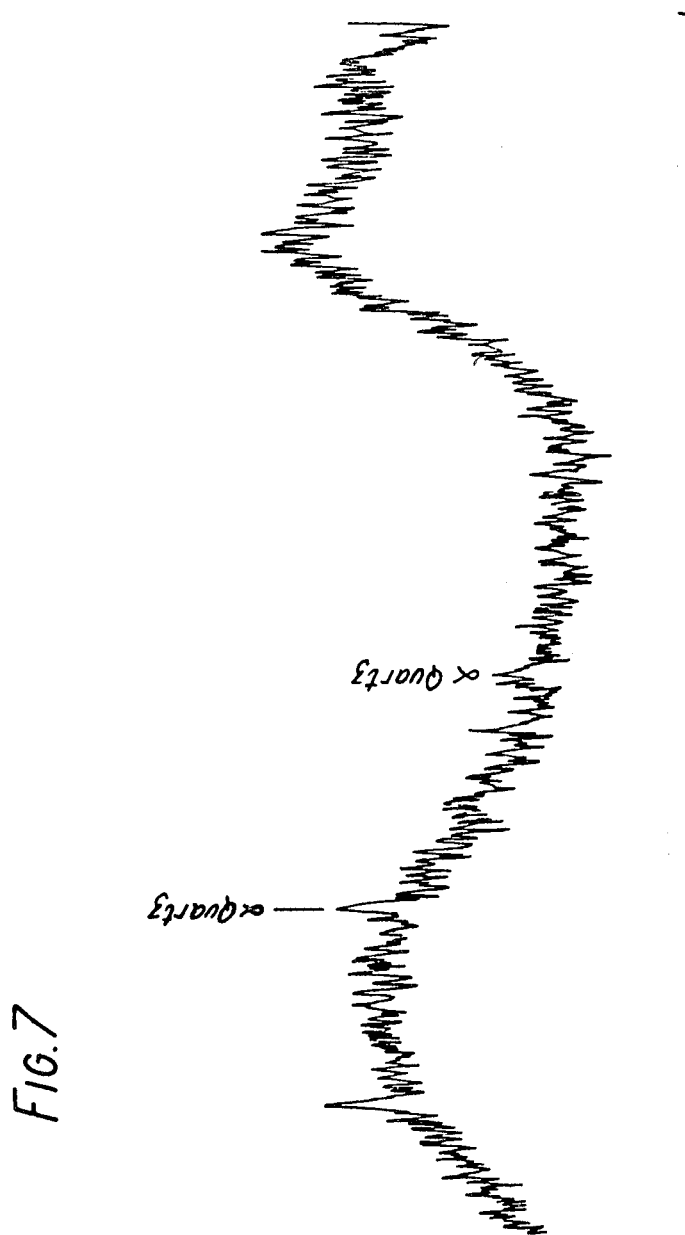
Figure 8:
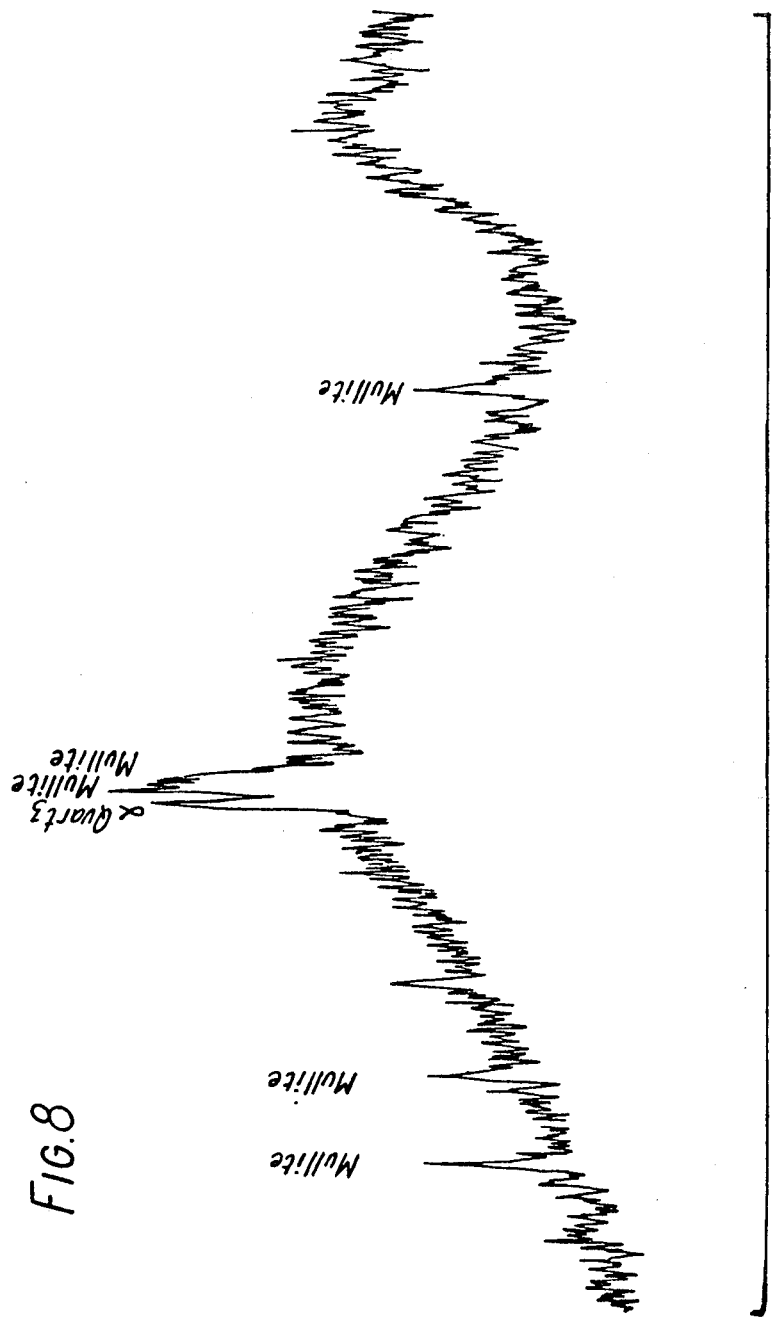
Figure 9:
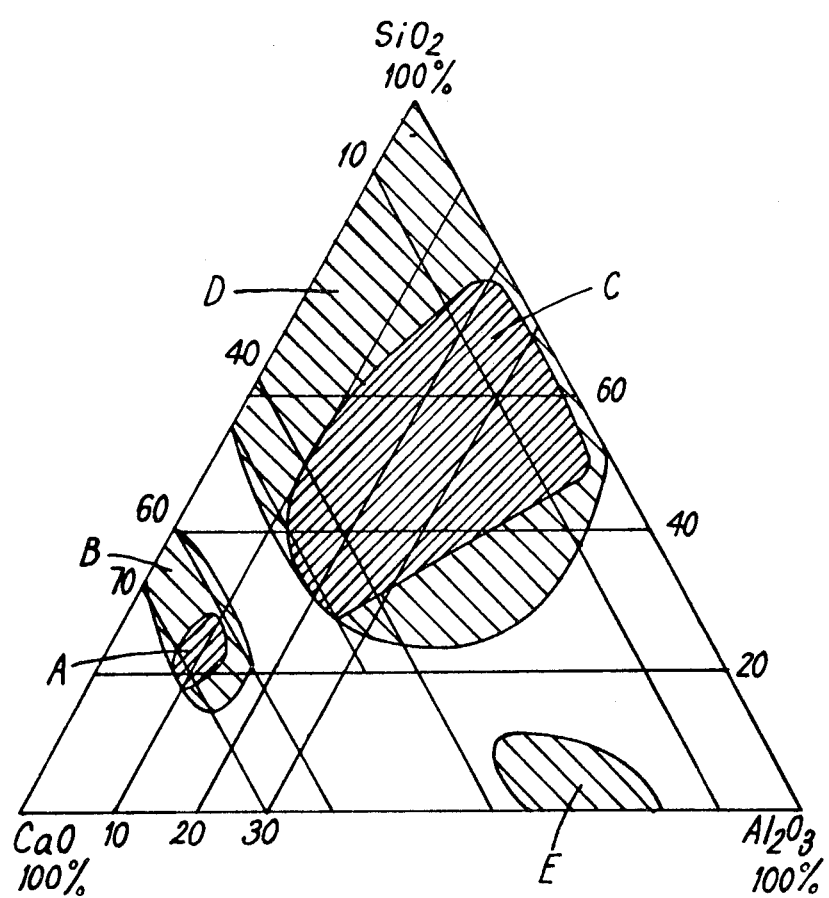

In further discussion of the invention reference is made to the accompanying drawings, in which:

FIG. 1 is a diagrammatic vertical section of one form of apparatus for firing a comminuted material containing colliery spoil, FIG. 2 is a diagrammatic vertical section of another form of apparatus, FIG. 3 is a flow sheet showing the production of portland cement from colliery spoil and a calcareous material, such as limestone, FIG. 4 is a flow sheet showing the production of pozzolanic slag-type material, FIG. 5 is a flow sheet illustrating the production of ordinary portland cement and aggregates by parallel plasma reactors employing colliery spoil as raw material, FIG. 6 is an X-ray diffraction diagram of a normal portland cement feed (limestone and clay) after passage through the plasma reactor of FIG. 1, showing the excellent development of cementitious constituents, FIG. 7 is an X-ray diffraction diagram of a 1:1 mixture of colliery spoil and limestone after passing through the plasma reactor in the system of FIG. 4, showing development of strong glassy phases, FIG. 8 is a similar diagram for a plasma treated colliery spoil, and FIG. 9 is a $CaO-SiO_2-Al_2O_3$ ternary phase diagram.

It is well known in the portland cement industry that cementing action is largely due to the presence of crystalline hydratable phases which are commonly referred to as and have the approximate composition shown below:

| | |
|---|---|
| $C_3S$ | $3CaO.SiO_2$ |
| $C_2S$ | $2CaO.SiO_2$ |
| $C_4AF$ | $4CaO.Al_2O_3.Fe_2O_3$ |
| $C_3A$ | $3CaO.Al_2O_3$ |

This terminology will be used below for convenience in the discussion of the operation of the illustrated apparatus. Reference is also made in the XRD diagram of FIG. 6 to Alite and Belite. These are phases well known to the cement technologist but their exact composition has never been determined. It is believed that they respectively have a large content of $C_3S$ and $C_2S$.

In FIG. 1 there is shown a reactor for manufacturing pozzolanic and cementitious materials in flight through an expanded precessive plasma zone. The plasma reactor comprises an enclosed chamber defined by thermal insulation within a shell 1. On the top of the shell there is located a support structure 2, which carries a fluid motor 3 which is connected by a crank drive 4 to a plasma gun 5, supported by a ball joint in a base member 6 of the structure 2. Rotation of the motor 3 thus serves to move the lower end of the plasma gun 5 about the vertical axis of the reactor. During this movement the longitudinal axis of the plasma gun is inclined to the axis of the reactor and there is no rotation of the plasma gun about its axis, so that connection of the hoses (not shown) for supply of gas and coolant to the plasma gun and the electrical supply cable 7 for the plasma gun cause no problems. The plasma gun is directed towards a ring-shaped carbon counter-electrode 9. A power source is connected between the plasma gun 5 and the counter-electrode 9. A series of inlet ducts 8, usually six to twelve in number, surround the plasma gun 5 and are supplied with comminuted feed material from a supply hopper, the feed material being concurrently blown towards the reaction axis under gas pressure, which may be air pressure.

In their descent through the reaction chamber the feed material particles are caused to obtain a horizontal velocity by reason of the circulatory precessing movement of the plasma in the direction of the arrow A and this results in the presence of a cloud of particles in the region around the upper part of the plasma column 1 which acts as a radiation shield between the plasma and the thermal insulation.

As the feed particles pass through the counter-electrode 9 and emerge from the characteristic plasma tail flame region which extends below the counter-electrode they are very intimately admixed with air injected via ducts 10 (only two shown) and the volatilized hydrocarbon content and the highly heated carbon of the colliery spoil or other carbonaceous component of the feed material are then rapidly oxidised in the downwardly extending combustion chamber 11. The decarburated material descends as particles for collection in the base region 12 from which it is removed by a grate cooler, diagrammatically indicated at 14. This removes the hot particles for cooling in the known way.

The hot gases, which probably have a substantial heat content and a substantial content of unburnt CO and perhaps hydrogen are removed via gas outlet ducts 15 (only one shown) and supplied to a heat recovery stage, usually incorporating a waste-heat boiler, which may surround the combustion chamber 11.

A substantial content of very fine solid particles (or possibly liquid droplets) are carried by the exit gases 15 and these may be separated, preferably after combustion of its CO content, in any of the dust collectors known in the art.

The cooling of the product particles collected at 12 may be carried out in different ways, according to the nature of the product. Thus if the product is cementitious, dry collection is made, while if it is pozzolanic a wet collection (in water) may also be made. It is possible in either case to adjust the operating parameters of the reactor, i.e. the feed rate, electric power and the precessing speed of the plasma gun to produce finely sintered product with minimal amount of large fused lumps. The latter, if present, can be easily granulated by any of the known methods. The system as shown is so arranged that although a reducing atmosphere prevails in the region above and immediately below the counter-electrode 9, the injection of air at 10, and at further ports downstream if necessary (not shown) will cause the carbon content to be fully burnt out and combine any iron present into the required phases, such as $C_4AF$ and others. Thus the system shown in FIG. 1 is not suitable for the separation of iron as metallic iron.

In the reactor of FIG. 2 the same reference numberals are employed to identify the same parts as in FIG. 1. In this reactor however the counter-electrode is constituted by a carbon bottom 19, which also acts as the collecting vessel for the molten product. In this instance the operation is carried out under mildly reducing conditions for the removal of iron from the feed material by reduction of the iron oxide content of the feed material. The produced metallic iron forms a separate layer 20 in the bottom and can be separated from the slag layer 21.

In this reactor mild oxidising conditions may be maintained if required so long as the carbon bottom 19 is covered by molten material. However the major use of this reactor lies in operating under reducing conditions which will allow the collection of molten metal. The products (metal 20 and slag 21) may be tapped through the tap holes 22 and 23 or the whole reactor may be made to tilt to draw off the molten material in the bottom. If the reactor is made tiltable, it may be periodically emptied, pouring off first the slag and then the collected metal via the gas outlet duct 24. When the molten slag is poured it may be additionally oxidised by means of an air blast during the granulation procedures.

In addition to the gas outlet duct the illustrated reactor would preferably be equipped with one or more air inlet ports to allow mild oxidising conditions to be maintained in the zone immediately over the molten slag layer 21.

It will of course be understood that the reactors of FIGS. 1 and 2 can be varied to a large extent in practice, but it is essential that energy transfer conditions associated with the presence of the plasma should be maintained in a substantial zone in the central chamber of the apparatus. While it is not essential in the reactor of FIG. 2 that the feed material should be brought into contact with expanded precessive plasma whilst in flight, it is greatly preferred that this should be achieved.

FIG. 3 represents schematically one system for the manufacture of hydraulic cement in which a relatively large proportion of limestone is contained in the feed material, as is the case for instance in ordinary portland cement. Colliery spoil 31 and mined limestone 32 are crushed in crushers 33 and 34 and stored in silos 35 and 36 respectively, and combined in blender 37. The blended raw material is dried with the gases recycled via conduit 44 and ground further (although a lesser degree of fineness is required as a rule than that specified in an orthodox process) in a drier-grinder 38. Where a wet process or semi-dry process is to be used for mixing the colliery spoil and limestone a spray drier 38a may be substituted in place of drier-grinder 38. The blended and ground raw material is transferred to silo 39, from which it is conveyed and mixed with hot air in conduit 43 before entry into preheater cyclone 40. Hot air in conduit 43 is derived from a product granulator 42. Preheated, air-entrained raw material, enters a plamsa reactor 41 which may be constructed as shown in either FIG. 1 or FIG. 2 through a plurality of circumferentially equispaced ducts (not shown) so as to form a cylindrical curtain of particles falling upon the upper portion of the expanded, precessing plasma. The products leaving the reactor 1 enter a granulator 42, where they are granulated with the help of a cold air blast via duct 53 and transferred to a final grinding stage 51, where addition of activators or other modifiers may be effected. Finally the product is transferred to product silo 52. The hot exhaust gases leaving the reactor 1, via a duct 46, may be utilised in a number of ways, one of which envisages the use of a waste-heat boiler 47, coupled to an electricity generator 48. The electricity generated in this way may, depending on the calorific value of the colliery spoil, be sufficient for the plasma reactor 41, while the exhausts 20 from the waste-heat boiler may be led away via conduit 50 for further utilisation in auxiliary operations. The optimal utilisation of the major heat exhausts will depend on a number of factors, the most important of which are: the carbon content of the colliery spoil or other carbonaceous source used; and the type of product produced, i.e. involving large or small amounts of calcareous matter.

FIG. 4 shows in a simplified diagrammatic way yet another aspect of the invention, namely manufacture of a plasma reactor slag. Equal amounts of colliery spoil and limestone (a total of 2.8 tonnes) are introduced to a drier/crusher 61, which is supplied with hot air via duct 67 from the cooler 65. The crushed and dried feed material is fed to a plasma reactor 62, generally of the type illustrated in FIG. 1. Air for combustion of carbon and hydrogen is introduced via duct 63, controlling the oxidation potential of the products. The excess heat resulting from the burning of the carbonaceous content of the colliery spoil is directed to the waste-heat boiler 64 and the resulting plasma reactor slag to the cooler 65. The slag obtained (2 tonnes) in this example can be water cooled, since it is not cementitious in itself, but requires the addition of any of the known activators. The energy recovered from the waste-heat boiler 64 is converted to electrical energy in energy converter 66 and employed for the operation of the plasma reactor 42. Mass and energy balances indicate that for instance with a 20% coal content colliery spoil, and conversion to electricity not higher than 30%, it is possible to manufacture a wide range of plasma reactor slags, providing all the electrical energy requirement of the reactor by utilising the combustible content of the spoil.

FIG. 5 illustrates another scheme for the utilisation of the calorific values of colliery spoil in the manufacture of useful products. In the scheme of FIG. 5 the major utilisation of the colliery spoil is in the production of relatively coarse aggregates by means of an expanded precessive plasma reactor and the utilisation of the surplus energy released in the aggregate production for driving a plasma reactor which produces ordinary portland cement under essentially endothermic conditions from a 1:4 blend of spoil and limestone. In this system the major utilisation of colliery spoil is in the production of the fused aggregates for which there is a widespread and growing demand in many areas.

In the diagram of FIG. 5 two plasma reactors 73 and 78 are used in parallel. Reactor 73 is supplied with 0.4 tonnes of colliery spoil and 1.6 tonnes of limestone crushed and dried in a drier/crusher 71, aided by the hot air effluents from the product cooler 75. The exhaust gases from the plasma reactor 73 are utilised in the waste-heat boiler 74 while the product is air cooled in cooler 75 to yield 1 tonne of portland cement. The plasma reactor 78 is supplied with 6.0 tonnes of colliery spoil, coarsely crushed and screened to a size in the range of 1-20 mm and dried in a drier/crusher 77, aided by hot gases from aggregate product cooler 80, carried through the duct 82. The large excess of heat generated from decarburation of the coal content of a colliery spoil of suitable calorific value is utilised in the waste-heat boiler 79, fed through the line 81, to energy converter 83, shown diagrammatically connected at 84 and 85 to supply the power requirements of plasma reactors 73 and 78.

The size of the connections shown at 76, 81, 84, 85 is intended to represent diagrammatically the distribution of the energy derived from the colliery spoil and recovered by the energy converter 83.

The actual extent of the heat derived from the colliery spoil will vary with the size of the coarse particles fed to the plasma. In most instances the particles will be decarburated only in a surface layer, leaving the treated particles with a surface layer of glassy, pozzolanic material, while the core of the particles could be virtually unchanged. This constitutes an important feature of the invention and the glassy surface of these relatively light weight aggregate particles should be considered as cement precursors. It should be noted that this glassy surface layer is essentially free of carbon so that it is in a state to be activated to a cementitious condition when brought into contact with alkaline cement components of a concrete-forming mix.

According to the calorific value of the carbonaceous content in the colliery spoil it is possible to arrange the ratio of products (aggregate and cement or cement precursor) in such a way that the surplus thermal energy released from the material treated in the plasma reactors 73 and 78 from the colliery spoil is sufficient to provide the electrical energy necessary to operate the reactors. While the possibility to provide all the electricity required by the process exists, it is not always necessary, or indeed practicable or economical, to use it.

Broadly speaking, the invention provides a process and apparatus for manufacture of four distinct groups of products which are listed in the ascending energy requirement:

(1) Aggregates—these require simply development of sufficient strength by suitable fusion with the development of the glass phase. In many cases a suitably thick surface layer of such glass, formed during passage through plasma will suffice. They need not contain any lime, hence low energy requirement.

(2) Pozzolanic PFA (pulverised fuel ash) type of bodies which contain as a rule only a small amount of CaO (1-15%) in the product and therefore require a small amount of energy to convert the original $CaCO_3$ content of limestone or chalk to the CaO stage. These bodies usually consist chiefly of aluminosilicates and some iron silicates but may also comprise only silica, e.g. sand with some small amount of iron oxide. Calcareous matter may be added or may already be present in sufficient amount. The products are glassy in structure.

(3) Pozzolanic Slag Type of Bodies. These are also glassy, in fact good pozzolanic properties are always associated with the glassy structure (this applies also to pozzolanic PFA) and crystallinity does not convey pozzolanic properties. Slag type bodies generally require more CaO in the product (25-45%) and hence their formation requires more energy to convert $CaCO_3$ to CaO than is required for the production of pozzolanic PFA.

(4) Portland cement bodies. These bodies are cementitious in themselves and all their cementitious components are crystalline. Their overall formation is much more endothermic because of the large CaO requirement which is approximately 60-70% of CaO in the product.

It should be mentioned that the manufacture of cementitious bodies with CaO content in the product of 50-60% is uneconomical because some of the phases which will form from such compositions are not cementitious. In the simplified ternary diagram $CaO-SiO_2-Al_2O_3$, the present invention extends the art of making pozzolanic and cementitious bodies to much wider regions than is practicable with conventional rotary kilns. The limitations of orthodox technology is due to the inability of rotary kilns to treat feeds having a very high or very low silica ratio. Silica ratio is defined as $SiO_2/(Al_2O_3+Fe_2O_3)$. Since the present invention treats the feed in flight, these limitations are overcome.

FIG. 6 shows the X-ray diffraction pattern by treating a conventional limestone/clay feed for portland cement production in an expanded precessing plasma reactor. FIG. 6 shows the development of highly crystalline phases with all the necessary components for cementitious behaviour typical of portland cement and only a very small residual uncombined lime content. FIG. 7 shows, on the other hand, the highly glassy content of the pozzolanic slag formed by the plasma treatment of a colliery spoil and limestone with only very insignificant crystalline $\alpha$-quartz peaks. This is as desired for a pozzolanic slag for admixture with portland cement or other activator. FIG. 8 shows the glass phase development resulting from the plasma treatment of pure colliery spoil with the characteristic peaks due to mullite and $\alpha$-quartz.

All the above three X-ray diffraction patterns were obtained by treating the respective feedstocks in flight.

The composition of the feed and of the product of FIGS. 8 and 7 is indicated in the following table:

| % | 100% Colliery Spoil | | 50% Colliery Spoil 50% Limestone | |
|---|---|---|---|---|
| | FEED | PRODUCT | FEED | PRODUCT |
| $SiO_2$ | 48.8 | 56.4 | 31.3 | 42.8 |
| $Al_2O_3$ | 23.9 | 30.8 | 13.3 | 20.1 |
| $Fe_2O_3$ | 3.2 | 4.5 | 2.6 | 3.3 |
| CaO | 1.4 | 1.9 | 22.4 | 28.5 |
| MgO | 1.2 | 3.9 | 1.0 | 2.7 |
| *LOI | 16.0 | — | 25.0 | 0.2 |
| **UD | 5.5 | 2.5 | 4.4 | 2.4 |
| | 100.0 | 100.0 | 100.0 | 100.0 |

*Loss on ignition
**Undetermined

The following table demonstrates the results obtained when the product B of FIG. 7 and the product A of FIG. 8 were admixed with ordinary portland cement in the indicated percentage and compared with the properties obtained when conventional blast furnace slag and conventional pozzolanic PFA were added in the same proportions.

| | COMPRESSION STRENGTH MN/m² I.S.O. MORTAR PRISM CURED AT 20° C. | | | POZZOLANICITY (LEA)* I.S.O. PRISM CURED AT 18° C. AND 50° C. | |
|---|---|---|---|---|---|
| | 20° C. | | | 18° C. | 50° C. |
| | 7 DAYS | 28 DAYS | | 7 DAYS | 7 DAYS |
| CONTROL PORTLAND CEMENT | 40.3 | 60.1 | | 41.7 | 38.8 |
| A 20% REPLACEMENT | 30.0 | 53.2 | 40% REPLACEMENT | 24.7 | 41.9 |
| CONTROL PFA 20% REPLACEMENT | 32.0 | 50.4 | " | 22.8 | 32.8 |
| B 50% REPLACEMENT | 20.0 | 61.9 | " | 26.9 | 43.1 |
| CONTROL SLAG 50% REPLACEMENT | 26.0 | 64.0 | " | 31.8 | 45.2 |

*F.M. Lea "The Chemistry of Concrete and Cement", page 449

The treatment of feed materials in expanded precessive materials can be applied in the cement industry in a variety of different ways. In particular the utilisation of colliery spoil and other carbonaceous materials of low calorific value provides a possibility of using a much wider range of indigenous materials previously considered only as waste or relatively useless. The plasma reactor may be used as a replacement of a conventional rotary kiln and because of its small size may be installed where an existing kiln requires replacement.

In another alternative the off-gases from a plasma reactor producing pozzolanic material and having a high residual calorific value may be supplied to and burnt in a conventional rotary kiln system.

FIG. 9 shows the composition of cementitious materials and pozzolanic materials which may be manufactured in accordance with the present invention. In this figure the area A shows the preferred and typical composition of a Portland Type Cement. The surrounding area B shows the compositions of cementitious materials which can be made by the present invention. Some cementitious materials falling within this area cannot be produced in a conventional rotary cement kiln because the silica/alumina ratio would cause the formation of incrustations on the kiln walls.

The area C shows the composition of preferred pozzolanic materials whilst the surrounding area D shows other useful pozzolanic materials that may be made by the use of expanded precessive plasma in accordance with the invention.

The area E shows the composition of high alumina cements which may be produced by the use of the invention.

It will be understood that in this diagram components other than CaO, $SiO_2$ and $Al_2O_3$ are ignored. However in practical cement compositions there may be present up to 6% MgO, 6% iron oxides and up to 10% others ($TiO_2$, MnO etc.).

However the minimum CaO content for the formation of hydraulic portland cement-type materials is 58% CaO and the maximum is 72% and for pozzolanic materials the maximum CaO content is 55%.

There have been many attempts at utilising low grade fuels in cement manufacture but such attempts have limited their use because of problems due to ash contamination of the cement clinker. The recovery of the thermal energy in the plasma reactor overcomes this problem. The off-gases from the reactor are most conveniently supplied to the flash calciner in which the limestone of the cement feed is calcined to CaO before entering the rotary cement kiln.

As already noted the process may also be used to produce cement and cement precursors from feed materials having a high iron content and is advantageous in producing usable metal as a by-product as well as removing unwanted iron or iron oxide from the product.

It is one of the advantages of the process of the present invention that the output of a plasma reactor is very large in relation to the size of the apparatus in comparison with the traditional kilns employed in the cement industry. Furthermore, high efficiency in a plasma reactor is reached at a relatively small size. In consequence it is possible to contemplate the installation of a plasma reactor to provide small scale production of cement and, in particular, of pozzolanic materials for conversion to hydraulic cement by addition of activators. A production of the order of 100 tons per day seems likely to be economic, particularly in a situation where local utilisation of recovered heat energy may be made. In consequence the present invention contemplates the location of a small scale cement or pozzolanic material plant in close proximity with any large scale colliery spoil heap and a concrete products casting plant to accept the product of the cement plant and to employ the waste heat from the calcination to effect accelerated curing of the cast concrete products.

The invention is further illustrated by reference to the following Examples 1-3.

EXAMPLE 1

MANUFACTURE OF ORDINARY PORTLAND CEMENT

Raw non-carbonaceous feed as conventionally employed for the manufacture of ordinary portland cement was ground and blended to pass through 350 μm sieve. Its analysis in weight percentage gave:

| | |
|---|---|
| $SiO_2$ | 12.8 % wt. |
| $Al_2O_3$ | 4.3 % wt. |
| $Fe_2O_3$ | 1.5 % wt. |
| Equiv. CaO in limestone $CaCO_3$ | 42.7 % wt. |
| Loss on ignition at 1000° C. (chiefly $CO_2$) | 35.7 % wt. |
| Undetermined comprising chiefly MgO; oliolis; $TiO_2$ | 3.0 % wt. |
| Total | 100.0 % wt. |

The above raw feed was fed to a laboratory scale expanded plasma reactor operating at 130 kW power to plasma, with the plasma gun orbiting at 1750 rpm. The primary gas used in the gun was argon at 16 liters per minute. In addition 45 liters per minute of air was used in order to entrain the feed, which was introduced at a rate of 40 g per second so as to form a cylindrical curtain falling upon the cone of expanded plasma. The treated feed fell under gravity to a stainless steel tray lined with fire-clay placed 50 cm below the exit duct of the reactor. The product was in the form of fused, easily friable fragments which gave the following analysis:

| | |
|---|---|
| $SiO_2$ | 20.1% |
| $Al_2O_3$ | 6.7% |
| $Fe_2O_3$ | 2.3% |
| CaO | 66.6% |
| Undetermined | 4.3% |
| Total | 100.0% |

The product was essentially free of carbon.

XRD analysis showed the correct development of the cementitious phases and a low residual uncombined CaO of 2.8%. All the hydraulic properties were confirmed in subsequent tests, showing the correct development of short term (3 days) and long term (28 days) strengths required by British Standard Specification No. 12.

In this example a very small reactor was used which carried only a minimal amount of the thermal insulation. Furthermore, no attempt was made to reduce these heat losses. On scaling up, the efficiency of this process could be considerably improved. Nevertheless, the above represents an energy conversion efficiency of better than 30% which represents a level of performance of a different order of efficiency compared with production of cement in plasma reported by Glasser, previously referred to.

EXAMPLE 2

MANUFACTURE OF LOW HEAT OF HYDRATION PORTLAND CEMENT FROM COLLIERY SPOIL

Colliery spoil of low coal content (~10% wt.) and the following composition was used:

| | |
|---|---|
| $SiO_2$ | 52.0% |
| $Al_2O_3$ | 19.7% |
| $Fe_2O_3$ | 7.2% |
| CaO | 2.4% |
| Loss on ignition at 1000° C. | 12.2% |
| Undetermined | 6.5% |

One part of the above colliery spoil and four parts of limestone of the following composition were used:

| | |
|---|---|
| $SiO_2$ | 5.8% |
| $Al_2O_3$ | 1.9% |
| $Fe_2O_3$ | 1.3% |
| Equiv. CaO | 50.1% |
| Loss on ignition at 1000° C. | 40.1% |
| Undetermined | 0.8% |

The limestone was ground to pass through 300 μm sieve and fed into the plasma reactor of FIG. 1 whose gun orbiting speed was 1300 rpm, electrical power supplied to plasma 130 kW. The primary gas forming plasma was argon which was fed at 16 liters per minute. The feed was introduced at a rate of 44 g/sec. (corresponding to 160 kg/hr) in the form of a cylindrical curtain of particles falling upon and through the conical plasma zone. The feed was allowed to fall under gravity and was collected in a stainless steel tray lined with a fireclay cement. The majority of the product was in a powdery form with a few fused particles. The colour of the product was very light, which was ascribed to the reduced conditions. Upon analysis the following was found:

| | |
|---|---|
| $SiO_2$ | 23.1% |
| $Al_2O_3$ | 8.5% |
| $Fe_2O_3$ | 3.4% |
| Combined CaO | 60.1% |
| Uncombined CaO | 1.5% |
| Undetermined | 3.3% |

The analysis showed absence of any residual calcium carbonate or free carbon. During this experiment, the collecting tray was placed at approximately 65 cm below the product exit of the reactor and all this space was filled with a mushroom-shaped flame. Ignoring the heat content of this flame, and the other heat losses associated with any small scale experimental reactor, the operation shows already a very impressive thermal efficiency of approximately 50%.

The product obtained as described above showed all the required cementitious phases and exhibited all the short term and long term physical properties expected of a low heat portland cement.

EXAMPLE 3

MANUFACTURE OF AGGREGATES

Coarse portion of a colliery spoil similar to that of Example 2 between 1 mm and 20 mm was used to illustrate this manufacture. The colliery spoil contained approximately 10% coal. The particles were introduced into a plasma reactor of the type shown in FIG. 1 in which the treatment of the feed particles is completed while the particles are in flight. As in Examples 1 and 2, the treated particles were collected in a tray. The reactor operated at 180 kW and the rate of feed was approximately 110 g/sec. The orbiting speed of the plasma was 1500 rpm. The primary plasma was formed with 16 liters per minute argon flow through the gun.

The merging product was in the shape of partially rounded bodies with occasional necking. Microscopic section showed the presence of a fairly uniform outer shell formation comprising substantially glass phase. Beneath this was an intermediate layer with some glass content and an inner substantially unaffected kernel.

I claim:

1. Apparatus for the production of hydraulic cements and pozzolanic materials comprising means for mixing and blending a calcareous material and a carbonaceous material containing silica, means for drying and grinding such blend to a comminuted condition, means for supplying hot gas to said drying and grinding means, a plasma reactor of the type in which at least one plasma gun orbits about a substantially vertical axis and is directed obliquely to said vertical axis and towards an opposed counter-electrode, said reactor including means for supplying a curtain of comminuted material to a cone of expanded precessive plasma developed within said plasma reactor, a feed preheater arranged between said drying and grinding means and said supplying means, granulating means for granulating material emerging from said plasma zone, means for passing a stream of air successively through said granulating means, said feed preheater and said feed drying and grinding means, a waste-heat boiler for recovery of heat energy released in the combustion of the calorific values of the carbonaceous material and means for generating electricity by use of the recovered thermal energy.

2. Apparatus for the production of hydraulic cements and pozzolanic materials comprises means for crushing and grinding a blend of calcareous material and a carbonaceous material, a plasma reactor of the type in which at least one plasma gun orbits about a substantially vertical axis and is directed downwardly obliquely to said vertical axis and towards an opposed ring-shaped counter-electrode, means for feeding a continuous stream of said blend to the upper end of said reactor to enter said reactor at a multiplicity of positions surrounding said orbit axis and placed to introduce the particles of said blend into expanded precessive plasma in a zone between said plasma gun and said counter-electrode, a combustion chamber below said ring-shaped counter-electrode, means for introducing a supply of air to said combustion chamber for combustion of combustible materials released from said blend, a waste-heat boiler system positioned to receive thermal energy from the combustion of combustible material in said combustion chamber, an energy converter for converting heat recovered in said waste-heat boiler system to electric power, means connecting said energy converted with said plasma reactor to supply power to said plasma and a solids product cooler below said combustion chamber.

* * * * *